F. W. EDWARDS.
AUTOMATIC FEED CONTROL FOR FLANGE OILERS.
APPLICATION FILED JAN. 5, 1921.
1,433,449.
Patented Oct. 24, 1922.
2 SHEETS—SHEET 2.
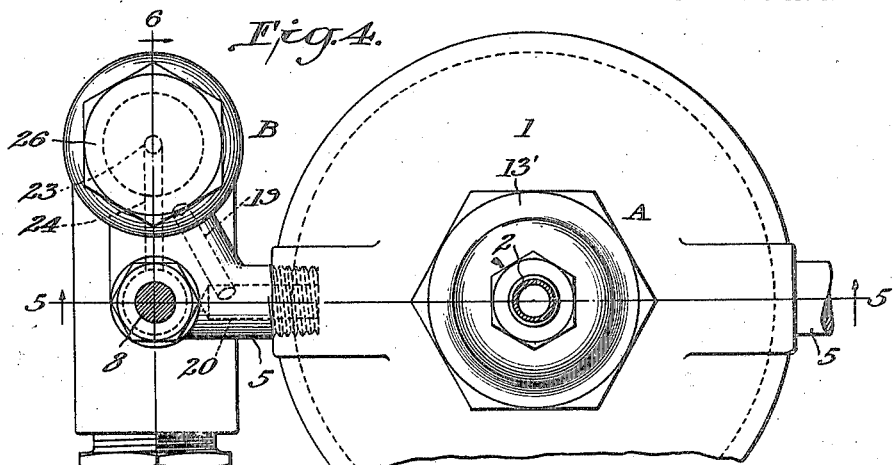
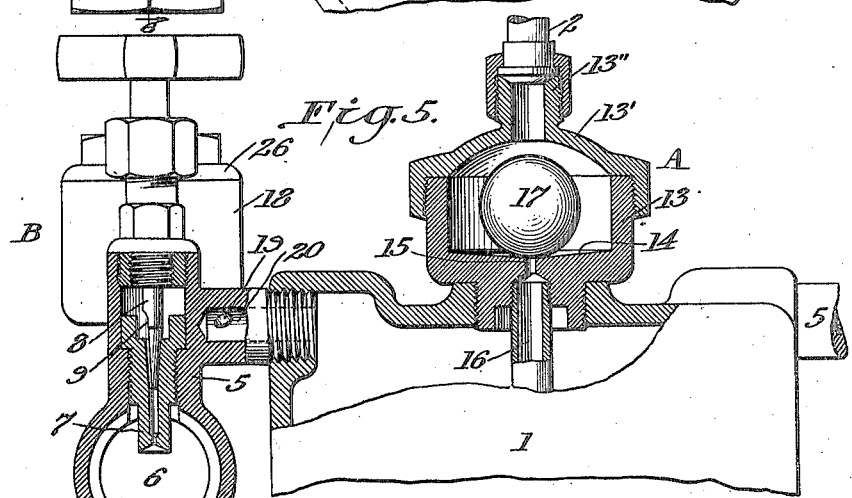
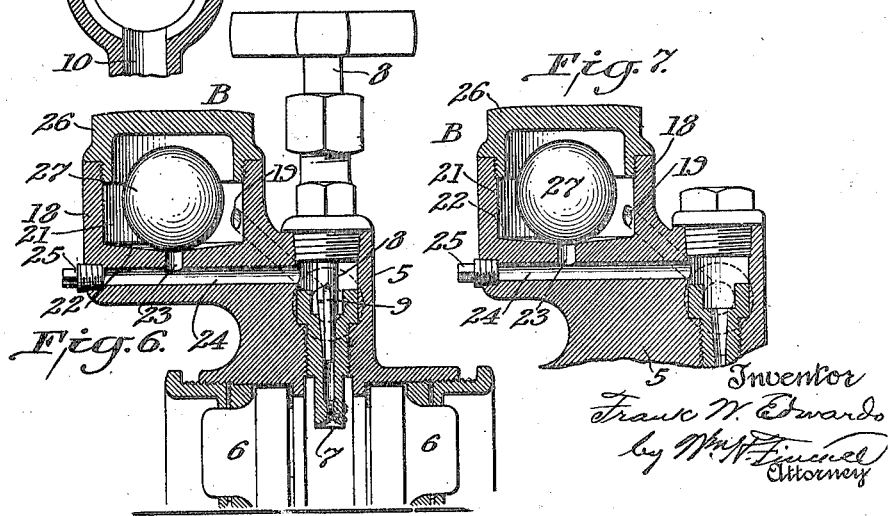
Inventor
Frank W. Edwards
by his Attorney Patented Oct. 24, 1922.

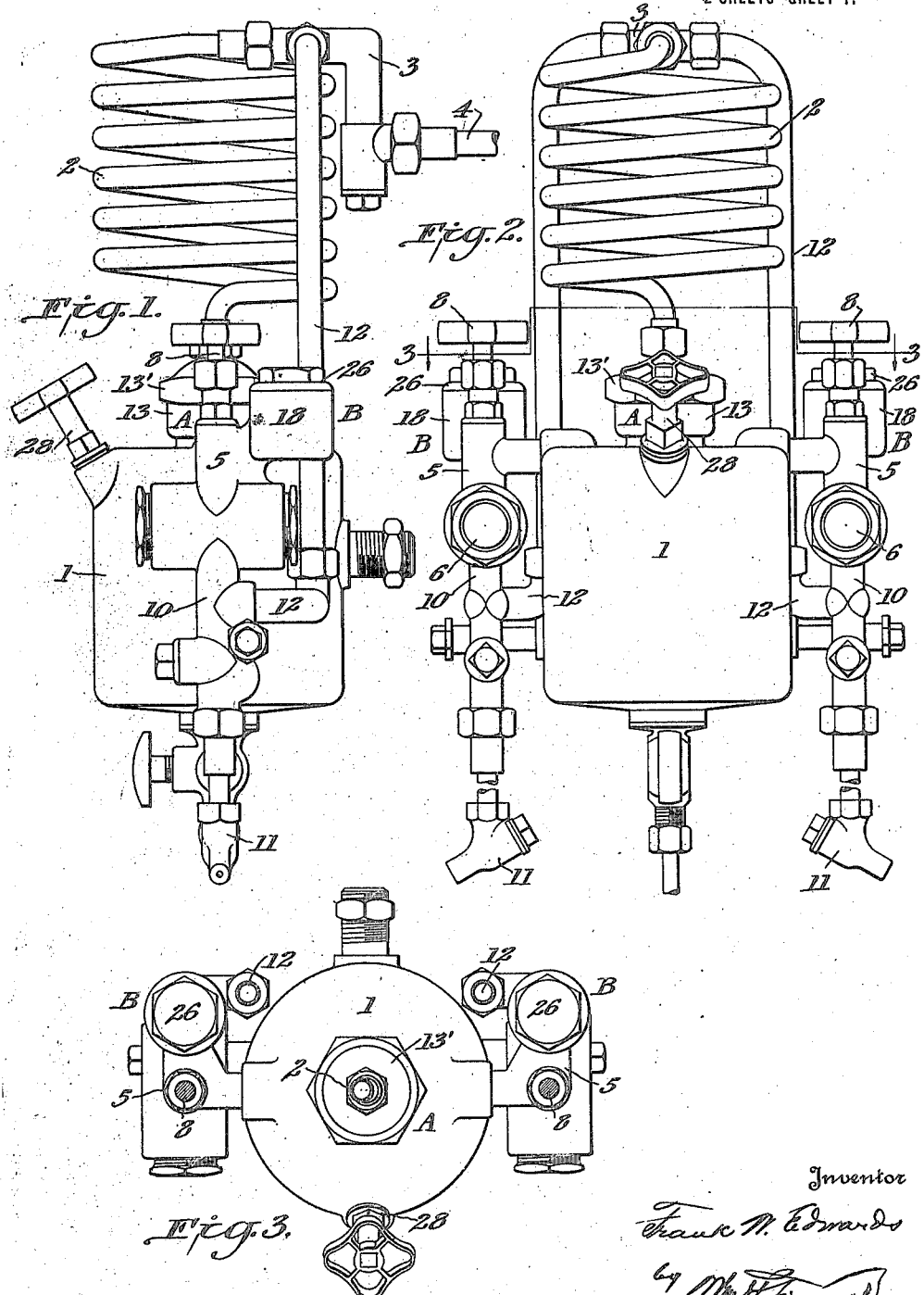

1,433,449

UNITED STATES PATENT OFFICE.

FRANK W. EDWARDS, OF CHICAGO, ILLINOIS.

AUTOMATIC FEED CONTROL FOR FLANGE OILERS.

Application filed January 5, 1921. Serial No. 435,121.

*To all whom it may concern:*

Be it known that I, FRANK W. EDWARDS, a citizen of the United States, residing at Chicago, in the county of Cook and State of Illinois, have invented a certain new and useful Improvement in Automatic Feed Controls for Flange Oilers, of which the following is a full, clear, and exact description.

The object of this invention is to provide an apparatus for supplying lubricant to such devices as flange oilers for the wheels of railway locomotives, the ordinary operation of which to control the flow of lubricant will be automatic and not require manual control by the engineer.

The advantages of such a device will be apparent when it is considered that some oiling devices, such as flange oilers, should operate only when the machine with which they are used is in motion, and the feed or source of supply to such devices should in the interest of economy and proper operation be cut off when the machine stops or remains standing.

Heretofore all lubricating devices of the character mentioned so far as I am aware, have depended for the starting and stopping of their operation upon the manipulation of various valves by the engineer, thus making it necessary that the engineer give these devices his attention when leaving his machine standing; and it has been a common experience, especially in the case of flange oilers for locomotives, that the engineer has neglected, when leaving his engine, to close the valves commonly used for controlling the operation of such oilers, thereby causing a waste of both steam and oil.

With my device, which is particularly adapted to lubricators of the condensation displacement type, I provide automatic valves which will allow lubricant to feed from the lubricator only when the machine with which it is used is in motion and capable of imparting motion to the lubricator, and when such motion ceases the feed of lubricant is cut off by the valves.

The invention consists in a lubricator having an oil bowl, and a condenser connected therewith and adapted to supply water of condensation to the oil bowl to raise the oil in the bowl and cause it to flow therefrom into feed arms and thence to the parts to be lubricated. Interposed between the condenser and the oil bowl is a gravity-seated motion-responsive valve, and a similar valve is also interposed between the oil bowl and the feed arm, whereby when the lubricator is subjected to such motion as will unseat these valves, feed of oil is obtained, but when the machine on which the lubricator is used is stationary the valves remain seated and feed of oil ceases.

In the accompanying drawings illustrating the invention, in the several figures of which like parts are similarly designated, Figure 1 is a side elevation showing my invention applied to a condensation displacement lubricator of the type shown in my Patent No. 948,301, granted February 1, 1910. Fig. 2 is a front view of same. Fig. 3 is a partial sectional plan view taken on line 3—3 of Fig. 2. Fig. 4 is a fragmentary plan view similar to Fig. 3, but showing the invention on a larger scale. Fig. 5 is a partial section taken in the plane of line 5—5, Fig. 4. Fig. 6 is a fragmentary sectional view taken in the plane of line 6—6, Fig. 4. Fig. 7 is a view similar to Fig. 6 but showing a modification wherein the valve for the feed tip is omitted.

The lubricator illustrated comprises an oil bowl 1, and a condensing coil 2, the latter being connected through a union 3 and pipe 4 with a source of supply of steam. When the device is used in connection with the flange oilers of a locomotive, the pipe 4 is preferably connected with the steam supply pipe of the locomotive air-pump between the valve for such supply and the pump, so that when the operation of the air-pump is started, and this is always the case when the locomotive is to be used, the supply of steam to the condenser 2 of the lubricator will be opened.

Connected with the oil bowl at diametrically opposite points, are feed arms 5, similar in all particulars, provided with sight glasses 6 through which the feed tips 7 (see Fig. 5) are visible. These tips may be provided with valves 8 by which the rapidity of feed of the oil to the tip may be regulated. In the lubricator of my patent above mentioned, it is possible to completely shut off the feed of oil to the tips by closing the valve corresponding to valve 8, but I find that with the device of this invention, it is undesirable to provide for cutting off the feed of oil at this point, and I therefore provide the valve 8 with a flattened portion 9, or in any other suitable way allow for a by-pass by means of which oil will always be fed to the feed tip when it is flowing from the chamber 21 hereinafter referred to. If desired, the valves 8 may be entirely omitted, as shown in Fig. 7.

From the feed tips 7 the oil drops into the feed pipes 10, whence it is conducted to the point to be lubricated, such as a wheel flange, by means of the nozzles 11, steam being conducted to the nozzles along with this oil so as to spray it from the nozzles by means of branches 12 connected with the pipes 10 and extending to the union 3.

Interposed between the condenser 2 and the oil bowl 1 is a motion-responsive valve A (see Fig. 5) comprising a chamber 13 having a radially inclined bottom 14 provided with a central aperture 15 communicating with the water pipe 16 which extends substantially to the bottom of the oil bowl and conducts water of condensation from the condenser 2 into the oil bowl to raise the oil therein. In this chamber 13 is mounted a heavy ball 17 adapted to center itself over and close the opening 15 when the lubricator is motionless, but capable when the lubricator is swayed or moved, as would be caused by the lurching of the locomotive when travelling, of rolling away from the opening 15 and allowing water of condensation to feed from the condenser into the pipe 16. It will thus be seen that no matter whether the engineer turns off the supply of steam to the condenser or not, no water will be fed from the condenser into the oil bowl except when the locomotive is in motion. The ball 17 is maintained in the chamber 13 by means of a cap 13' provided with a nipple 13'' which affords a means of connection for the end of the condenser.

In addition to the valve just described, I provide a similar valve B in the passage between the oil bowl and the feed arm, and this valve comprises a casing 18 preferably formed integral with the feed arm and provided with a duct 19 which communicates with a passage 20 leading to the oil bowl and with a chamber 21 having a radially inclined bottom 22, similar to the bottom 14 of the chamber 13, this chamber 21 having arranged centrally of its bottom an opening 23 communicating with a duct 24 leading to the feed arm and provided with a plug 25 which may be removed for cleaning purposes. Mounted in the chamber 21 and held therein by a cap 26 is a ball 27 operating in the same manner as the ball 17.

It will be seen that when the water of condensation from the condenser raises the level of the oil in the oil bowl 1, this oil will flow through the passage 20 and duct 19 into the chamber 21, and if the ball 27 is seated over the opening 23, no oil can feed therefrom into the feed arm 5, but if the ball is unseated from the opening 23 and is rolling around in the chamber 21, as will be the case when the lubricator is in motion, oil will feed through the opening 23 and duct 24 into the feed arm and thence through the feed tip 7 to the pipe 10 and parts to be lubricated.

By this device I make the operation of the lubricator automatic and independent of the control of the engineer, except as to supplying steam to the condenser. But as the supply of steam for the condenser is taken from the supply to the air-pump when the device is used upon a locomotive, and as the air-pump is always in operation when the locomotive is in operation, steam will be supplied to the condenser of the lubricator at all times when the operation of the device is desired, but oil cannot flow from the lubricator except when the locomotive is in motion.

In addition to the ball 17 acting as a cut-off for the water of condensation, it acts as a safety device to prevent mishap should it be attempted to fill the oil bowl with oil by removing the filling plug 28 when steam is being admitted to the condenser.

I am aware that is not new in a lubricator to use a ball valve adapted to be unseated by movement of a part to which the lubricator is attached and to seat when such movement ceases, to thereby establish and cut off the feed of lubricant respectively, but I do not know of any instance where ball valves have been used in the combination hereinabove recited and hereinafter claimed.

I have shown and described my invention as applied to a flange oiling lubricator of the condensation displacement type, and it is to such a lubricator that my invention is particularly adapted, but it is to be understood that I do not intend thereby to limit it to this particular application, nor do I consider it limited to the particular details of construction and arrangement of parts shown, as it is obvious that it is capable of various other installations and modifications without departing from the spirit of the invention or the scope of the following claims.

What I claim is:—

1. In a lubricator, an oil bowl, a condenser connected therewith, and a check valve interposed between said condenser and bowl and adapted to remain closed when said bowl remains stationary and to open intermittently upon intermittent movement of said bowl.

2. In a lubricator, an oil bowl, a condenser connected therewith, a steam pipe connected with said condenser and adapted to supply steam to be condensed by said condenser for the purpose of displacing the oil in said bowl, and a motion responsive valve interposed between said condenser and bowl to interrupt the feed from said condenser to said bowl when the lubricator is stationary and to open feed communication therebetween when said lubricator is moved.

3. In a lubricator, an oil bowl, a condenser connected therewith, a steam pipe connected with said condenser and adapted to supply steam to be condensed by the condenser for the purpose of displacing the oil in said bowl, a feed arm communicating with said bowl and adapted to receive the oil displaced, a motion responsive valve interposed between said condenser and bowl, and a motion responsive valve in said feed arm, for the purpose specified.

4. In a lubricator, an oil bowl, a condenser communicating with a source of steam and connected with said bowl for supplying water of condensation to said bowl to displace the oil therein, a motion responsive valve interposed between said condenser and bowl and adapted to remain closed when the lubricator is motionless and to open intermittently upon intermittent motion of said lubricator, a feed arm communicating with said bowl and adapted to receive the displaced oil therefrom, a motion responsive valve interposed between said bowl and arm and operating in like manner as the abovementioned valve for controlling the flow of oil from said bowl to said arm, and a manually operable valve in said feed arm for regulating the flow of oil after it passes said last-mentioned motion-responsive valve.

5. In a lubricator, an oil bowl, a condenser communicating with a source of steam and connected with said bowl for supplying water of condensation thereto, and a gravity-seated motion-responsive ball valve interposed between said condenser and bowl for the purpose specified.

6. In a lubricator, an oil bowl, a condenser, and a gravity-seated valve interposed and affording a normally closed connection therebetween, said valve adapted to be unseated by movement of said lubricator to open communication between the condenser and bowl and to close such communication upon cessation of such motion.

7. In a lubricator, as oil bowl, a condenser, a feed arm, gravity-seated valves interposed between said condenser and bowl and bowl and arm respectively and adapted to be unseated by movement of said lubricator and to reseat upon cessation of such movement, and a manually operable valve in said arm for regulating the flow of oil after it passes the valve between said bowl and arm.

8. In a lubricator, an oil bowl, a condenser, a feed arm, gravity-seated ball valves interposed between said condenser and bowl and bowl and arm respectively and adapted to be unseated by movement of said lubricator and to reseat upon cessation of such movement, and a manually operable needle valve in said arm for regulating the flow of oil after it passes the valve between said bowl and arm.

9. In a lubricator, an oil bowl, a condenser communicating with a source of steam and connected with said bowl for supplying water of condensation to said bowl to displace the oil therein, a motion responsive ball valve interposed between said condenser and bowl and adapted to remain closed when the lubricator is motionless and to open intermittently upon intermittent motion of said lubricator, a feed arm communicating with said bowl and adapted to receive the displaced oil therefrom, and a motion responsive ball valve interposed between said bowl and arm and operating in like manner as the abovementioned valve for controlling the flow of oil from said bowl to said arm.

In testimony whereof I have hereunto set my hand this 3'd day of January A. D. 1921.

FRANK W. EDWARDS.

Witnesses:
  WILLIAM S. FURRY,
  GEORGE M. DICKSON.